Feb. 3, 1942. W. LYTLE 2,272,016
ENGINE MOUNTING
Filed April 4, 1941
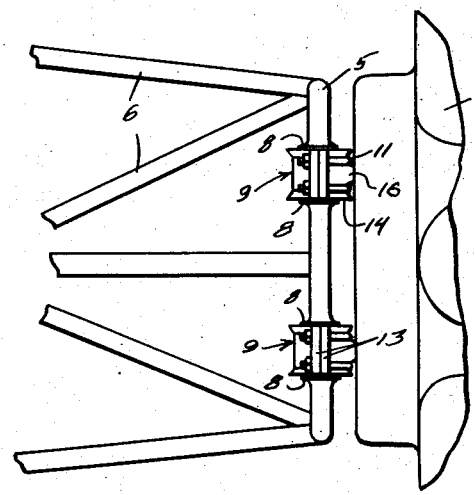
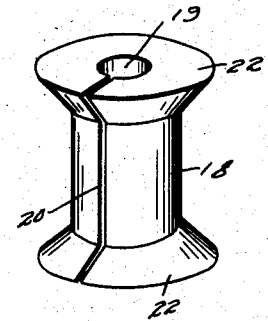
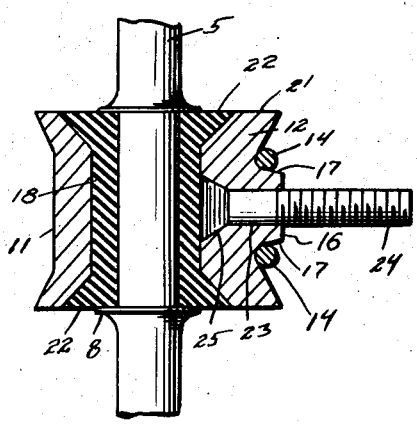
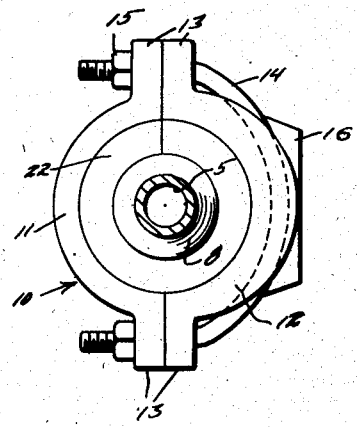
Inventor
WAYNE LYTLE
By Clarence A. O'Brien
Attorney Patented Feb. 3, 1942

2,272,016

UNITED STATES PATENT OFFICE 2,272,016

ENGINE MOUNTING

Wayne Lytle, Hillsboro, Oreg.

Application April 4, 1941, Serial No. 386,905

3 Claims. (Cl. 248—5)

This invention relates to improvements in mounting devices for supporting an aircraft engine upon the engine-carrying ring of the aircraft; and an object of the invention is to eliminate, in connection with the securing of the engine to the supporting ring, the contact of metal against metal.

The invention, together with its objects and advantages, will be best understood from a study of the following description taken in connection with the accompanying drawing wherein—

Figure 1 is a partly schematic elevational view of a fragmentary portion of an engine-supporting frame and an engine supported thereby by mounts embodying the features of the present invention.

Figure 2 is a sectional view through the mount, with a portion of the ring shown in elevation.

Figure 3 is an end elevational view of the mount, with the supporting ring shown in section.

Figure 4 is a perspective view of a bushing forming part of the mount.

Referring more in detail to the drawing, it will be seen that the numeral 5 indicates generally the engine-carrying or supporting ring which is of common construction and supported by struts 6 extending from the aeroplane frame; while the reference numeral 7 indicates the fragmentarily shown portion of a conventional aeroplane engine.

In accordance with the present invention the ring 5 is provided, to a suitable number, with pairs of spaced flanges or collars 8 made integral with or otherwise positively secured on the ring 5.

Between the collars or flanges 8 of each pair is secured a mount 9. The size of the ring 5 and the motor 7 will determine the number of mounts 9 to be employed.

Each mount 9, in accordance with the present invention, embodies a clamp 10 divided into a pair of complemental half-sections 11, 12 that embrace the ring 5 and at their meeting edges are provided with outstanding apertured lugs or ears 13 to accommodate the ends of substantially U-bolts 14 that serve to secure the members 11 and 12 of the clamp in proper relative position. Each of the bolts 14 have the ends thereof suitably threaded to accommodate securing nuts 15, and the section 12 is provided on its exterior with a lug formation 16 against which a portion of the engine block abuts or rests as shown in Figure 1.

Above and below the lug formation 16, the member 12 of the clamp 10 is provided with grooves 17 to accommodate the clamping bolts 14 as shown.

Also each mount 9 embodies a substantially cylindrical bushing 18 that is secured between the sections 11 and 12 of the clamp 10.

The body of the bushing 18 is provided with a through opening 19 to accommodate the supporting ring 5, and is also provided with a slit 20 extending for the full length of the body of the bushing as a lateral re-entrance opening for the bore or through opening 19 to permit, in an obvious manner, ready disposition of the bushing 18 about the supporting ring 5, and removal of the bushing from about the ring with equal facility.

It will thus be seen that the bushing 18 serves to space the clamp members 11 and 12 from the supporting ring 5 and associated flanges or collars 8 with the result that there is no metal-to-metal contact between the mounts 9 and the ring 5.

Preferably the sections 11 and 12 of the clamp 10 of the mount, and at opposite ends of the clamp, are complementarily formed to provide substantially conical recesses 21 in which substantially conical flanges 22 formed on the respective opposite ends of the bushing 18 seat, as shown to advantage in Figure 2.

Also the section 12 of the clamp, and in the region of the boss or lug formation 16, is provided with an opening 23 to accommodate the head-equipped end of the bolt or stud 24 that is engaged with the usual stud on the engine 7 in a manner to secure the engine to the mounting.

At the inner end of the bore or opening 23, the clamp section 12 is counterbored as at 25 to accommodate the head 26 of the bolt or stud 24. Preferably the head 26 is non-circular in cross section and the counterbore 25 will be of a corresponding shape so as to coact with the head 26 in preventing rotation of the stud or bolt 24.

From the foregoing it will be seen that each mounting 9 may be readily engaged and secured on the supporting ring 5; is held positively between the flanges or collars 8 against shifting movement circumferentially relative to the supporting ring 5; and that the mountings, and the use thereof, require very little departure from the ordinary construction of engine-supporting ring, and no material alteration in the construction of the engine to be mounted on such supporting ring.

The above and numerous other advantages of the invention, together with the simplicity thereof, are believed such as to require no further detailed description.

While I have herein illustrated and described the preferred embodiment of the invention, it is to be understood that I do not limit myself to the precise details of construction, combination and arrangement of elements as herein illustrated, but claim all such forms of the invention to which I am entitled and as coming within the scope of the appended claims.

Having thus described the invention what is claimed as new is:

1. A mount for connecting an engine with an engine-supporting ring, said mount embodying an axially bored clamp divided longitudinally into sections, said sections at the joint therebetween provided with laterally extending apertured ears, U-bolts straddling one of the sections of the clamp and having their respective opposite ends equipped with nuts and threaded through the apertures in the ears for securing the sections of the clamp together, and a cylindrical resilient bushing mounted in the bore of the clamp and slit longitudinally.

2. A mount for connecting an engine with an engine-supporting ring, said mount embodying an axially bored clamp divided longitudinally into sections, said sections at the joint therebetween provided with laterally extending apertured ears, U-bolts straddling one of the sections of the clamp and having their respective opposite ends equipped with nuts and threaded through the apertures in the ears for securing the sections of the clamp together, and a cylindrical resilient bushing mounted in the bore of the clamp and slit longitudinally, and one of said clamp sections having an opening therethrough at right angles to the axis of the clamp, and a stud bolt extending outwardly from the clamp through said opening.

3. A mount for connecting an engine with an engine supporting ring, said mount embodying an axially bored clamp divided longitudinally into sections, said sections at the joint therebetween provided with laterally extending apertured ears, U bolts straddling one of the sections of the clamp and having their respective opposite ends equipped with nuts and threaded through the apertures in the ears for securing the sections of the clamp together, and a cylindrical resilient bushing mounted in the bore of the clamp and slit longitudinally, the bore of the clamp and the ends of said bushing having outwardly flared ends fitting together to prevent relative slipping of said clamp and bushing.

WAYNE LYTLE.